United States Patent
Piantadosi (10) Patent No.: US 11,180,077 B1
(45) Date of Patent: Nov. 23, 2021

(54) SELECTIVELY-ILLUMINABLE LUG NUT ASSEMBLY

(71) Applicant: Vincent Thomas Piantadosi, Sugarhill, GA (US)

(72) Inventor: Vincent Thomas Piantadosi, Sugarhill, GA (US)

(*) Notice: Subject to any disclaimer, the term of this patent is extended or adjusted under 35 U.S.C. 154(b) by 0 days.

(21) Appl. No.: 16/729,779

(22) Filed: Dec. 30, 2019

Related U.S. Application Data (60) Provisional application No. 62/786,083, filed on Dec. 28, 2018.

(51) Int. Cl.
| | | |
|---|---|---|
| *B60Q 1/32* | (2006.01) | |
| *F16B 37/14* | (2006.01) | |
| *F21S 9/02* | (2006.01) | |
| *F21V 23/04* | (2006.01) | |
| *F21Y 105/18* | (2016.01) | |
| *F21Y 115/10* | (2016.01) | |

(52) U.S. Cl.
CPC .............. *B60Q 1/326* (2013.01); *F16B 37/14* (2013.01); *F21S 9/02* (2013.01); *F21V 23/0471* (2013.01); *F21Y 2105/18* (2016.08); *F21Y 2115/10* (2016.08)

(58) Field of Classification Search
None
See application file for complete search history.

(56) References Cited

U.S. PATENT DOCUMENTS

| | | |
|---|---|---|
| 3,113,727 A | 12/1963 | Bradway |
| 6,238,158 B1 | 5/2001 | Clements |
| 7,703,958 B2 | 4/2010 | Christoff |
| 8,525,653 B1 | 9/2013 | Bing et al. |
| 2004/0037085 A1 | 2/2004 | Panzarella |
| 2005/0099820 A1 | 5/2005 | Cooper |
| 2006/0239018 A1 | 10/2006 | Jardin |
| 2008/0080955 A1 | 4/2008 | Liu |
| 2013/0208491 A1 | 8/2013 | Franklin |
| 2015/0260379 A1* | 9/2015 | Li .................. F21K 9/275 362/217.13 |
| 2015/0343942 A1 | 12/2015 | Vaughn |

* cited by examiner

*Primary Examiner* — Ashok Patel (57) ABSTRACT

A selectively-illuminable lug nut assembly includes a lug nut body portion and an illumination subassembly housed within a containment portion at an upper end of the lug nut body. The lug nut main body portion may have a multi-faceted exterior and a threaded aperture extending into a lower end for threading engagement with a threaded vehicle wheel stud. At an upper end, the lug nut body defines a containment portion for housing the illumination subassembly. The assembly may incorporate a light and/or motion sensor for automatically biasing the assembly between ON and OFF states. Furthermore, a printed circuit board having LEDs mounted thereon may be in communication with a remote control device enabling a user to selectively bias the assembly between the ON and OFF states.

13 Claims, 9 Drawing Sheets

SELECTIVELY-ILLUMINABLE LUG NUT ASSEMBLY

CROSS-REFERENCE TO RELATED APPLICATION

This U.S. non-provisional patent application claims the benefit of U.S. provisional patent application No. 62/786,083 filed on Dec. 28, 2018, the entire contents of which are incorporated-by-reference herein.

FIELD OF THE INVENTION

This invention generally relates to vehicle lug nuts. More particularly, the invention pertains to illuminable vehicle lug nuts.

BACKGROUND OF THE INVENTION

Various types and styles of accessory lights are commonly incorporated into vehicles for both added visibility of the vehicle during dark conditions (e.g. in the evening), as well as for producing a desired decorative lighting effect. A lug nut is a nut with one rounded or conical (tapered) closed distal end opposite an open internally-threaded proximal attachment end, used on steel (and most aluminum) wheels. A set of lug nuts are typically used to secure a wheel (i.e. a tire mounted to a rim) to threaded studs and, thereby, to an end of one of a vehicle's axles. Vehicle wheel lug nuts are manufactured having a variety of form factors; that is, they come in a variety of shapes and geometries. Aftermarket alloy and forged rims often require specific lug nuts to match their mounting holes, so it is often required to purchase a new set of lug nuts when the vehicle rims are changed.

It has been proposed to create an illuminated lug nut by means of attaching an illuminable lug nut cover to an existing conventional vehicle wheel lug nut, wherein the lug nut cover is specifically configured to include a body having a light-emitting source at one end and a recessed portion at an opposite cover end, wherein the recessed portion is particularly constructed/designed to be seated about the exterior surface of the existing lug nut so as to enclose the lug nut within a lug nut cover interior space. Utilizing a lug nut cover as an illumination means has some inherent disadvantages, drawbacks and/or limitations. For example, removing a covered lug nut from a threaded stud in order to remove a vehicle wheel necessitates first removing the lug nut cover, to expose the underlying lug nut, to avoid damaging the illuminable lug nut covering during removal of the underlying lug nut. Even if the lug nut cover is constructed to minimize the risk of functionally damaging the illumination mechanism, substantial torque that is necessarily applied to the lug nut (and, thereby, to the lug nut covering) by a lug nut removal tool would virtually guarantee aesthetic damage to the cover in the form of cracks, scratches, and the like. Another reason that a covering on a standard lug nut would have to be removed prior to removing the underlying lug nut is that the covering would change the lug nut dimensions. Unless the covering was constructed with exterior dimensions matching an existing standard lug nut socket size, it would have to be removed to expose the lug nut regardless of the durability of the cover.

Accordingly, it would be highly desirable to provide an illuminable lug nut assembly incorporating an illumination mechanism in the form of a light-emitting subassembly directly integrated into the lug nut body itself, in a manner that would result in an illuminable lug nut assembly capable of engagement by a torque force-applying lug nut removal tool, without the aforementioned risk of either functional or aesthetic/ornamental damage. It would be preferable to provide such an illuminable lug nut assembly having a robust construction enabling a user to easily engage the exterior surface of the lug nut body using conventional lug nut removal tools—such as conventional lug nut socket and impact wrenches—without imparting either functional or aesthetic damage to the illuminable lug nut assembly.

It would be beneficial to provide such a robust illuminable lug nut assembly wherein the illumination is in the form of colored lighting generated via a set of light-emitting diodes (LEDs) emitting a respective variety of lighting colors. It would be further desirable to incorporate such a multi-color light-emitting subassembly enabling a user to remotely control the assembly, via a corresponding remote control device, to thereby selectively change the color of light being emitted by one or more of the series of lug nuts, as well as to selectively alternate between two or more available lighting modes (e.g., between blinking and non-blinking modes, between a variety of available non-blinking emitted colors, etc.).

Optimally, the illuminable lug nut assembly would further incorporate a printed circuit board (PCB) having circuitry in electrical communication with electronic components of the light-emitting subassembly and capable of being adequately energized by a wristwatch-type battery—alternatively referred to as a "button cell," "coin cell," and "watch cell"). Furthermore, it would be advantageous to optionally provide such an assembly having a motion sensor and/or a light sensor—alternatively referred to as a "photoelectric device" or a "photo sensor"—incorporated into the light-generating subassembly and powered by the battery to automatically bias the assembly between an "ON" state (i.e., during which time light is emitted from the assembly) and an "OFF" state (i.e., during which time light is not emitted from the assembly). For example, in this manner, the illuminable lug nut assembly could be set to be automatically biased into an ON state during periods of time when there is less than a predefined level of ambient light detected by a light sensor (e.g., while a vehicle is being operated during the evening). Similarly, with respect to the incorporation of a motion sensor, the illuminable lug nut assembly could be biased into an ON state when the motion sensor detects vehicular motion (e.g., while a vehicle is being driven).

SUMMARY OF THE INVENTION

The present invention addresses the well-established need for an illuminable lug nut assembly that overcomes the aforementioned limitations, drawbacks, and disadvantages of known devices by providing a selectively-illuminable lug nut assembly, generally including a rigid housing having a first housing portion and a second housing portion, the first housing portion having an internally-threaded bore extending from a proximal end thereof and terminating at a first housing portion interior end wall, the internally-threaded bore extending longitudinally along a central axis of the illuminable lug nut assembly, and the second housing portion containing an illumination subassembly, wherein, upon threadably attaching the first housing portion to a wheel stud of a vehicle, light emitted from the illumination subassembly is visible to the naked eye at a distal end of the second housing portion.

In some embodiments, the illuminable lug nut assembly the first and second housing portions may comprise a unitary structure.

In some embodiments, the first and second housing portions may comprise independent structures releasably attachable to one another.

In some embodiments, the first housing portion may comprises a lug nut main body; and the second housing portion may comprise an illumination subassembly containment portion extending distally from a lug nut shoulder interconnecting the lug nut main body and the illumination containment portion.

In some embodiments, the illumination subassembly containment portion may further include:

an annular sidewall extending distally from a lower surface of the illumination subassembly containment portion, whereby the annular sidewall and the lower surface of the illumination subassembly define an illumination subassembly containment portion interior space for containing the illumination subassembly; and a circular lug nut cap seated upon an interior shoulder of the annular sidewall.

In some embodiments, an upper surface of the lug nut cap may include:

a perimeter sidewall; and an annular interior portion defining a central cavity, wherein the annular interior portion is radially inset from the perimeter sidewall to define an annular groove therebetween.

In some embodiments, the illuminable lug nut assembly may include:

a battery; and a printed circuit board assembly overlying an upper surface of the battery, wherein the battery and printed circuit board assembly are seated within the illumination subassembly containment portion interior space.

In some embodiments, the illuminable lug nut assembly may include:

a light-emitting diode (LED) light ring seated within the lug nut cap annular groove; and a sensor (e.g. a light sensor or a motion detection sensor) seated within the central cavity in the upper surface of the lug nut cap, wherein the LED light ring is electrically connected to both LED circuitry of the printed circuit board assembly and a negative terminal of the battery, wherein the sensor is electrically connected to sensor circuitry of the printed circuit board assembly, and wherein the printed circuit board assembly is electrically connected to a positive terminal of the battery.

In some embodiments, the illuminable lug nut assembly may include:

a lug nut main body having a proximal end and an opposite distal end; and an illumination subassembly containment body releasably attachable to the distal end of the lug nut main body.

In some embodiments, the lug nut main body may include:

an exterior surface;

an internally-threaded bore extending from the proximal end of the lug nut main body and terminating at a lug nut main body interior end wall, whereby the threaded bore defines a main body interior space sized, shaped and configured for threading engagement with a vehicle wheel stud; and a distal end exterior surface having a central aperture provided therein and extending completely through the lug nut main body interior end wall.

In some embodiments, the illumination subassembly containment body include:

a circular base having an upper surface and a lower surface, wherein the lower surface of the circular base has a central aperture provided therein; and a contiguous sidewall circumscribing the circular base and extending distally a distance beyond the upper surface of the circular base to define an interior containment space of the illumination subassembly containment body, wherein the contiguous sidewall of the illumination subassembly containment body may have one or more apertures extending therethrough.

In some embodiments, the illumination subassembly may include:

an end cap releasably coupled to a distal portion of the illumination subassembly containment body.

In some embodiments, the end cap may include:

a cylindrical sidewall having at least one aperture extending therethrough;

a transverse wall horizontally-traversing an interior surface of the end cap cylindrical sidewall and slightly inset from a distal edge of the end cap annular sidewall, whereby the transverse wall has an upper surface and a lower surface, the lower surface of the transverse wall and the interior surface of the cylindrical sidewall, together, defining an illumination subassembly containment space; and a peripheral lip projecting radially outward from a distal edge of the end cap cylindrical sidewall, the transverse wall having LED-receiving apertures surrounding a central sensor-receiving aperture.

In some embodiments, the illumination subassembly may include:

a battery; and a printed circuit board assembly (PCBA) overlying an upper surface of the battery, whereby the PCBA has light-emitting diodes and a sensor (e.g. a light sensor or motion detection sensor) disposed upon an upper printed circuit board surface, wherein the battery and overlying PCBA are seated within the illumination subassembly containment space of the end cap such that the LEDs and the sensor on the upper surface extend into the respective LED-receiving apertures and sensor-receiving aperture in the transverse wall of the end cap.

In some embodiments, the illumination subassembly may include a translucent pane, or cover, seated within a shallow depression defined by the interior surface of the end cap cylindrical sidewall and the upper surface of the slightly-inset transverse wall.

In some embodiments, the illuminable lug nut assembly may include:

a series of radially spaced-apart recesses provided in a peripheral edge portion of the distal end exterior surface of the lug nut main body; and a corresponding series of radially spaced-apart projections extending proximally from the sidewall of the end cap, whereby the radially spaced-apart projections of the end cap sidewall are received within the radially spaced-apart recesses of the lug nut main body during assembly.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying figures, where like numerals denote like elements, and in which.

DETAILED DESCRIPTION OF EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. There is no intention to be bound by any expressed or implied theory presented in the preceding technical field, background, brief summary or the following detailed description. It is also to be understood that any specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
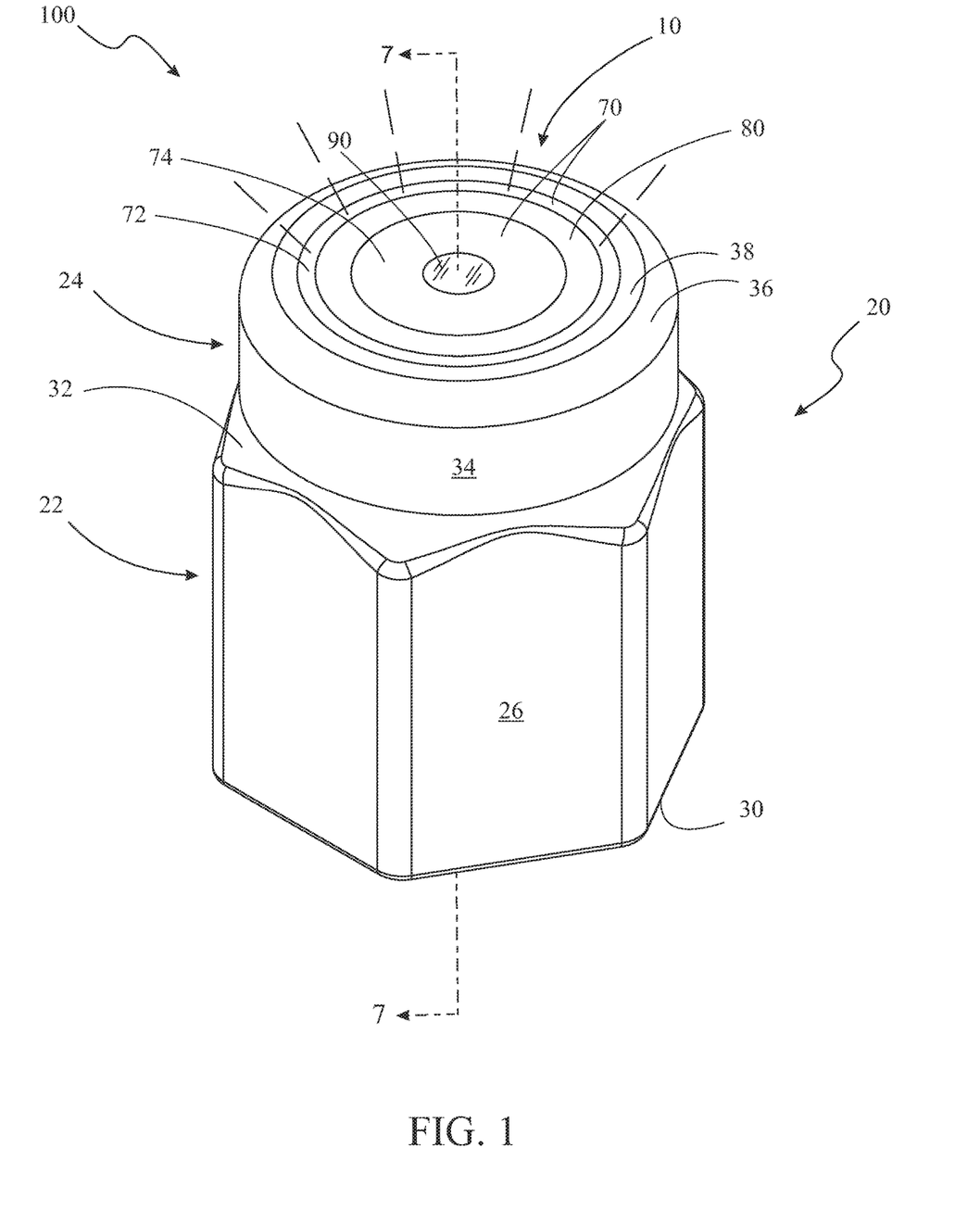
FIG. 1 is a top perspective view of a selectively-illuminable vehicle lug nut assembly, in a fully-assembled state, in accordance with an exemplary implementation.
Figure 2:
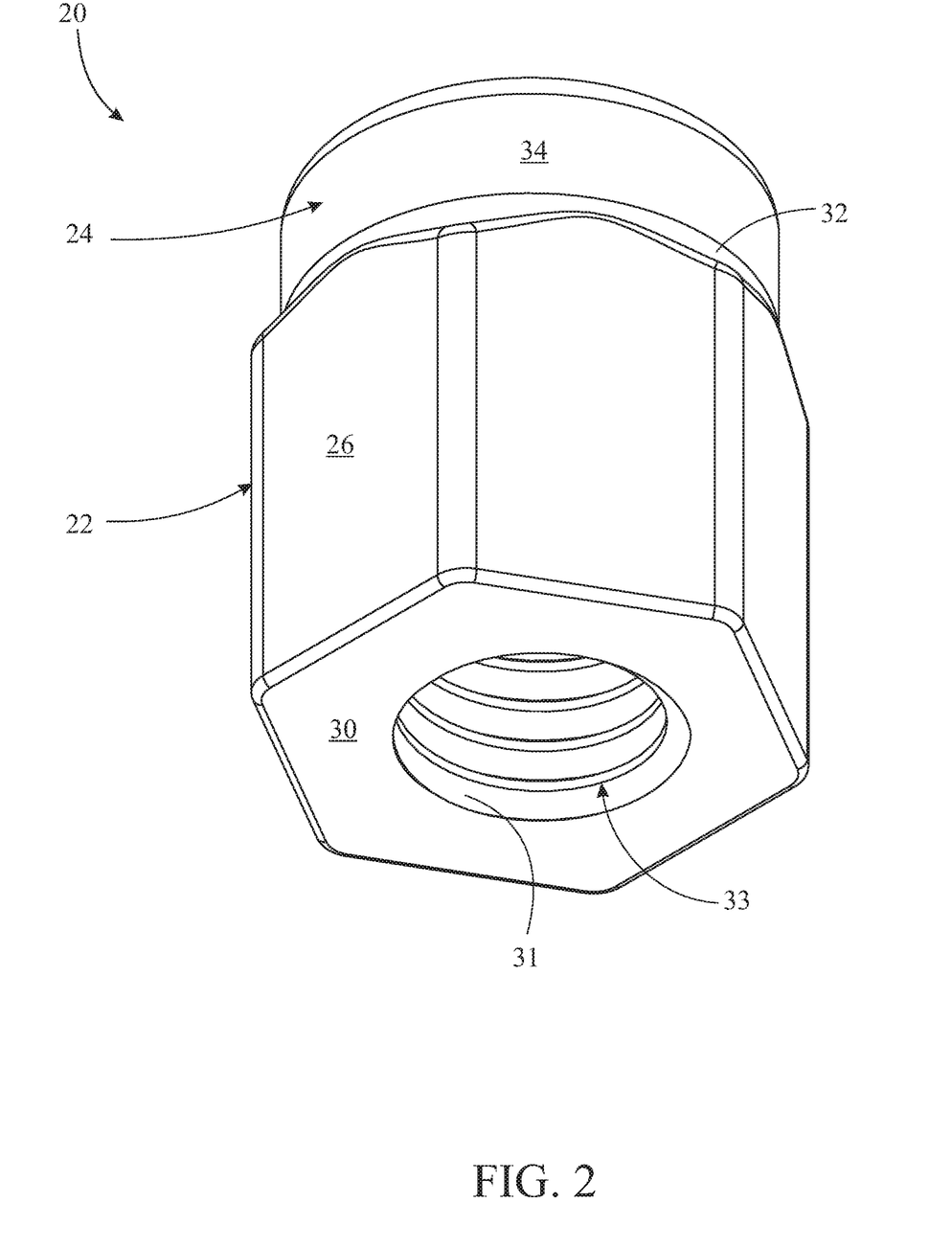
FIG. 2 is a bottom perspective view of the lug nut assembly shown in FIG. 1.
Figure 3:
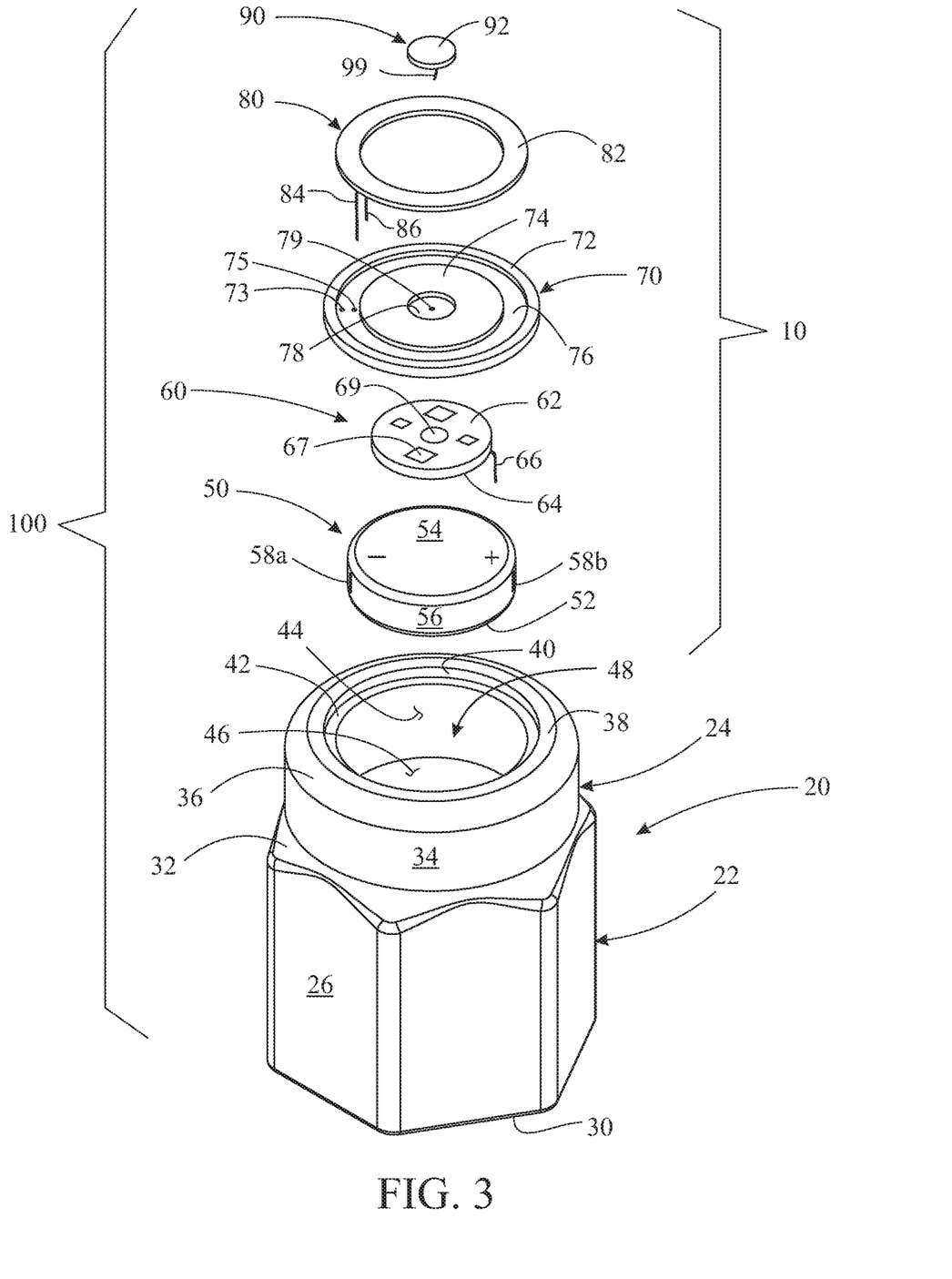
FIG. 3 is an exploded view of the lug nut assembly shown in FIG. 1.
Figure 4:
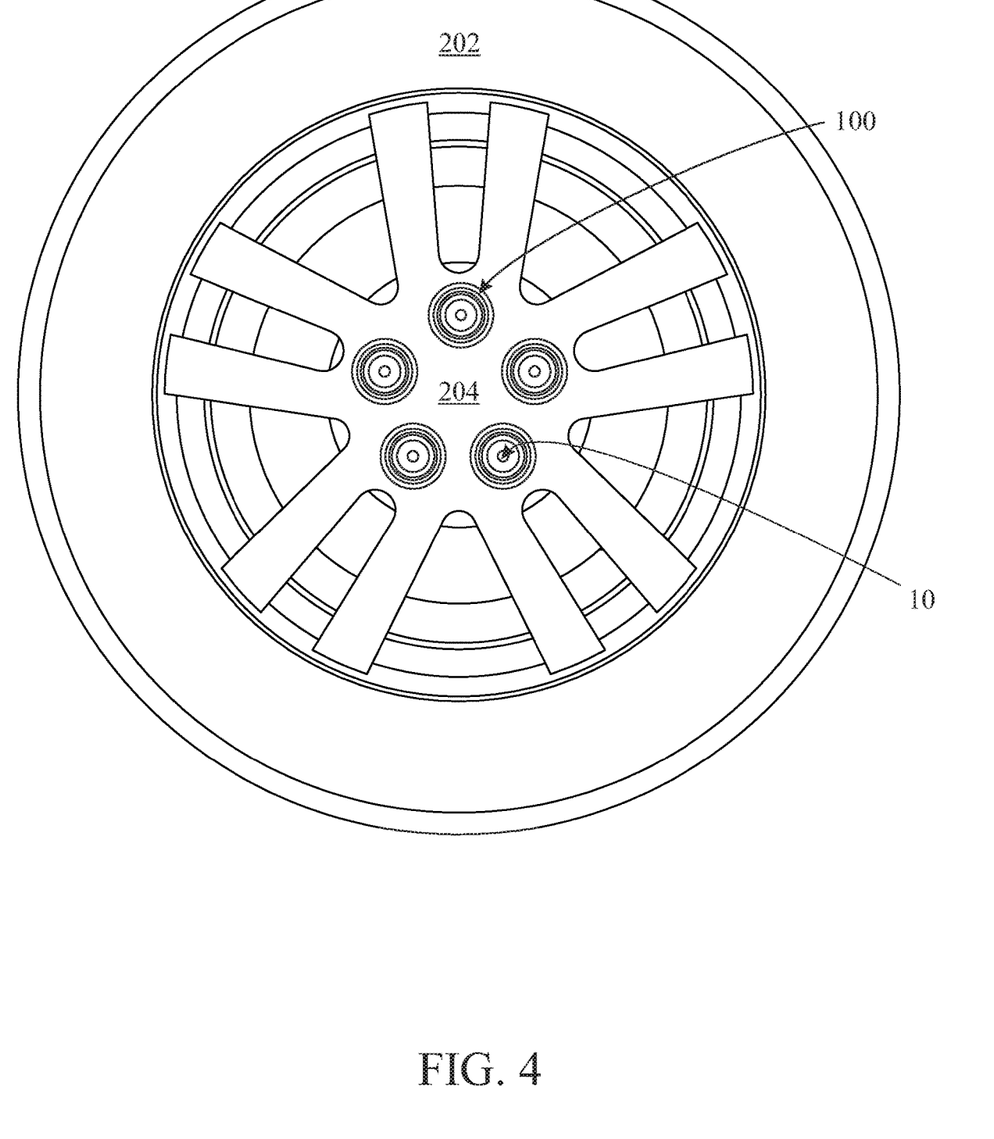
FIG. 4 is a front elevation view of a set of selectively-illuminable vehicle lug nut assemblies affixed to threaded studs (not shown) of a vehicle tire mounted thereon.

Referring now to FIGS. 1-8, and as best shown in FIG. 3, an illuminable lug nut assembly, generally referred to by reference numeral 100, includes an illumination subassembly 10 integrated with a lug nut 20. The lug nut 20 may incorporate a one-piece lug nut main body 22 taking on a variety of configurations. For example, in some embodiments (e.g. those shown in FIGS. 1-3 and 7) the lug nut main body 22 may incorporate a conventional hexagonal main body incorporating facets 26 and having a distal end portion 24 configured for containing an illumination subassembly 10. In still other embodiments (e.g. illuminated lug nut assembly 400 shown in FIGS. 9A-10B) a main body 402 may be releasably attachable to a stand-alone housing structure 420 containing an illumination subassembly 495. As will be appreciated by those skilled in the art, the present invention may incorporate myriad different housing structures without departing from the scope of the invention.

Referring again specifically to the illuminated lug nut assembly 100 shown in FIGS. 1-3 and 7, the aforementioned distal end portion functions as a containment portion, or containment structure, for light-emitting subassembly 10. The lug nut main body 22 may have a contiguous exterior surface defined by adjoining lug nut facets 26, and a lower end 30 having a threaded aperture 31 provided therein and defining a threaded stud-receiving interior space 33 terminating at a distal end surface 35 (FIG. 7), which is configured for threading engagement with a vehicle threaded wheel stud (not shown). Lug nut main body 22 is contiguous with light-emitting subassembly containment portion 24. Containment portion 24 is at least partially defined by a lug nut annular wall 34 provided at an upper end of the lug nut 20 and adjoined to main body 22 via a lug nut shoulder 32, or other transition portion.

Figure 7:
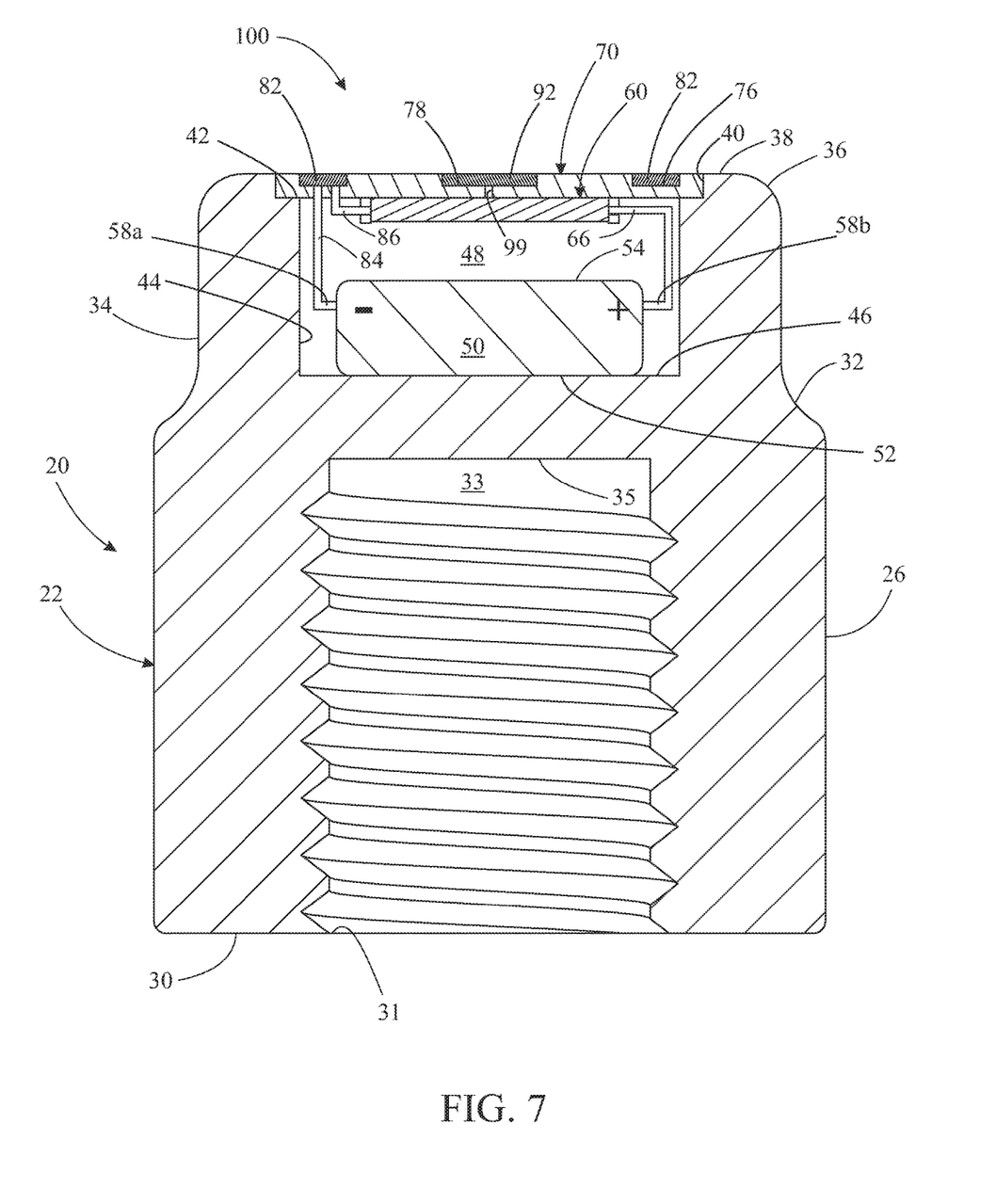
FIG. 7 is a cross-sectional view taken along section line 7-7 of FIG. 1 (i.e. through central axis of the assembly 10)
Figure 8:
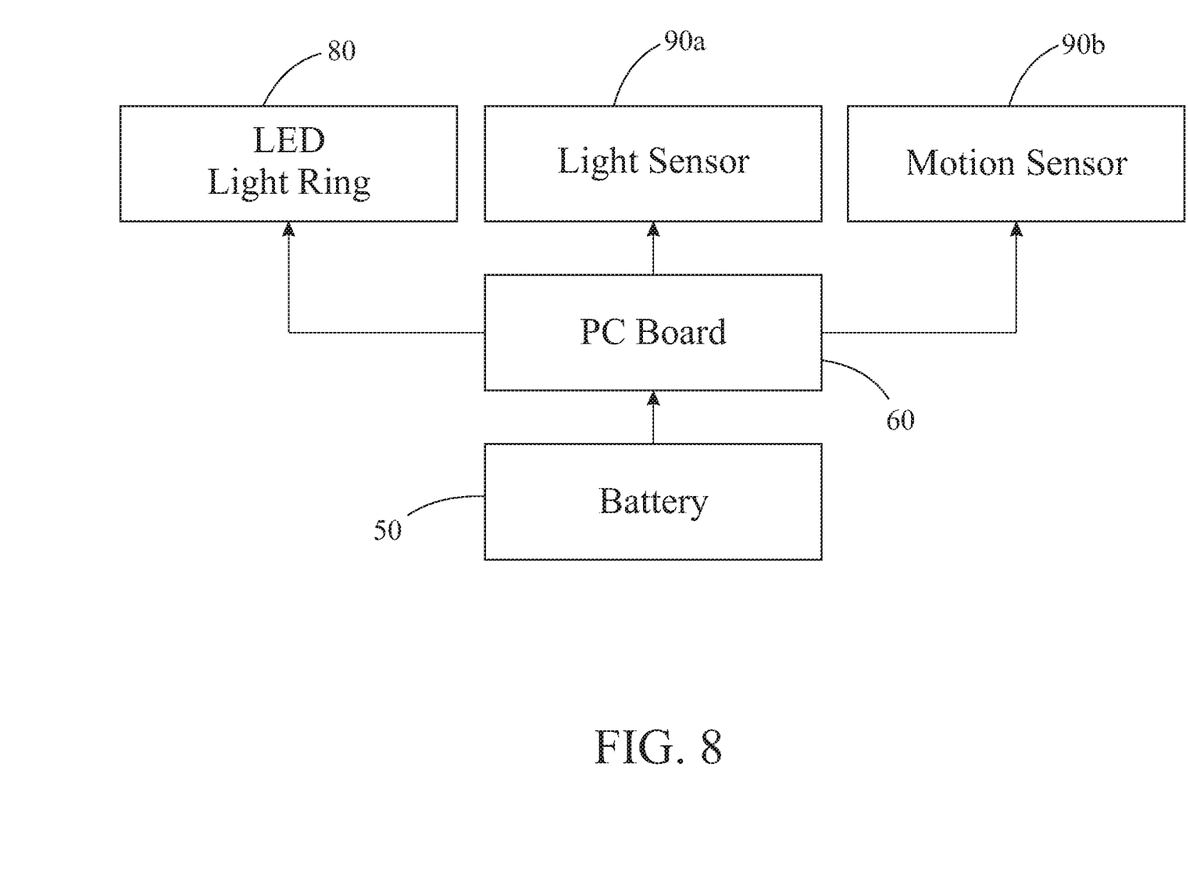
FIG. 8 is an electrical schematic block diagram of a selectively-illuminable vehicle lug nut assembly in accordance with an exemplary implementation of the invention.

The lug nut annular wall 34 may be further defined by rounded transition portion 36 adjoining an exterior surface of the annular wall with an upper end surface 38. An interior containment space 48 for housing the illumination subassembly 10 is at least partially defined by a lower surface 46 having an interior vertical sidewall 44 extending upwardly therefrom and terminating at an interior shoulder 42 defined by the transition surface adjoining interior vertical sidewall 44 with interior vertical sidewall 40. The interior shoulder 42 is sized, shaped, and otherwise configured for having a lug nut cap, shown generally as reference numeral 70, seated therein.

Significantly, the lug nut cap 70 is particularly configured to contain a battery 50 and a printed circuit board 60 therein. The battery 50 is preferably a conventional off-the-shelf low-profile circular coin-type battery, such as those conventionally used to power, for example, watches and other low-power electronic devices. The battery 50 has a lower surface 52, an upper surface 54, and an adjoining sidewall 56 incorporating a negative (−) terminal 58a and a positive (+) terminal 58b angularly offset from one another by 180 degrees. When fully assembled, the lower surface 52 of battery 50 rests upon lower surface 46 of containment portion 24 of lug nut 20.

The printed circuit board (PCB) 60 may have a circular perimeter separating an upper surface 62 and a lower surface 64, and incorporates one or more light-emitting diodes (LEDs) and corresponding circuitry, shown generally as reference numeral 67, and light/motion detector circuitry 69 on its upper surface 62. In a fully-assembled state, the light/motion detector circuitry 69 is in electrical communication with a main body 92 of a respective sensor 90 via an electrical lead 99 extending through a central aperture 79 in central cavity 78 of lug nut cap 70. Furthermore, the PCB 60 may incorporate at least one electrical interconnection element 66 electrically attached to positive lead 58a of battery 50. In electronics, an LED circuit or LED driver is an electrical circuit used to power a light-emitting diode (LED). The circuit provides sufficient current to light the LED at the required brightness, while limiting the current to avoid damaging the LED. The voltage drop across an LED is approximately constant over a wide range of operating current; therefore, a small increase in applied voltage greatly increases the current. Such LED circuits are well known in the electronics arts and further description is not necessary to enable one skilled in the art to practice the present invention.

Lug nut cap 70 is generally defined by a circular exterior perimeter sidewall 72, and annular interior portion 74, together defining an outer annular channel 76, or annular groove, therebetween. The annular groove 76 is sized, shaped, and otherwise configured for having an LED lighting ring 80, conforming to the annular groove, seated therein. Furthermore, the annular interior portion 74 defines a central sensor body-receiving cavity 78 for receiving and seating a light sensor and/or motion sensor (generally denoted by reference character 90) therein. A first electrical connector 84 of LED light ring 80 extends through a first aperture 73 extending through annular channel/groove 76 of lug nut cap 70 for electrical connection to the negative terminal 52 of battery 50. A second electrical connector 86 of light ring 80 extends through a second aperture 75 extending through annular groove 76 of lug nut cap 70 for electrical connection to underlying printed circuit board 60.

Light-emitting diode (LED) ring 80 has an annular body 82 conforming to the annular groove 76 provided in the upper surface of lug nut cap 70. The LED light ring is generally constructed of a translucent annular ring body 86 having a series of LEDs electrically connected to one another as well as to a common power source via the LED circuitry 67 of the PCB 60.

Figure 5:
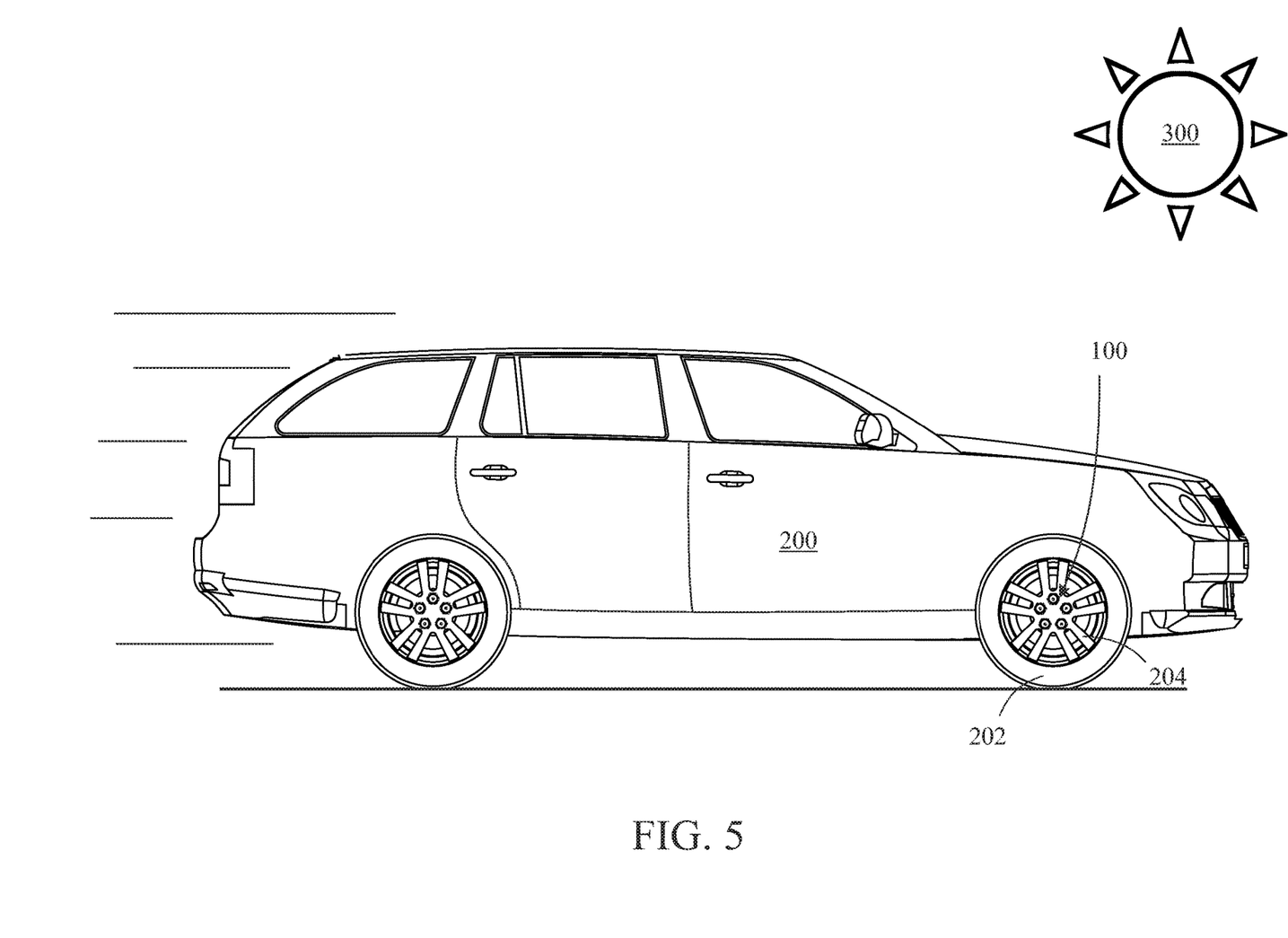
FIG. 5 is a front elevation view of a vehicle incorporating the selectively-illuminable vehicle lug nut assemblies of the present invention, with the lug nut assemblies show in a non-illuminated state.
Figure 6:
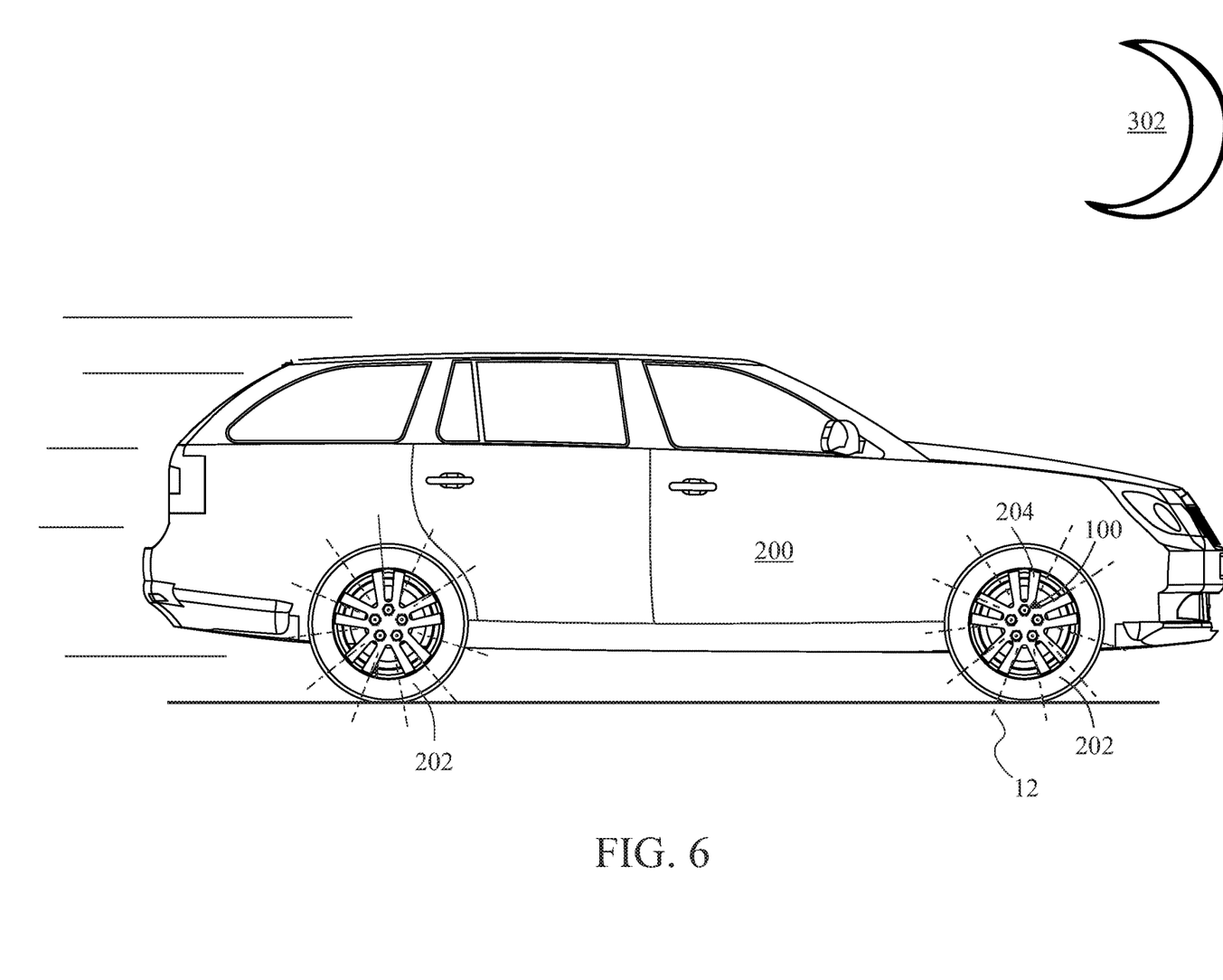
FIG. 6 is a front elevation view of a vehicle incorporating the selectively-illuminable vehicle lug nut assemblies of the present invention, with the lug nut assemblies show in an illuminated state.

A light and/or motion sensor, shown generally as reference numeral 90, is provided for automatically biasing the light-emitting subassembly between an "ON" state and an "OFF" state (as described in the Background section above), based upon environmental lighting conditions 300, 302 and/or motion of the tires/wheels 202 (and thus accompanying rims 204) of a vehicle 200. A light sensor is a photoelectric device that converts light energy of various wavelengths (from infrared to ultraviolet) into electrical energy (or to an electrical signal). Various photoelectric devices for sensing the light are known but they incorporate a common underlying principle. The light sensor generates an output signal indicating the intensity of light by measuring the radiant energy that exists in a very narrow range of frequencies basically called "light," and which ranges in frequency from "Infra-red" to "Visible" up to "Ultraviolet" light spectrum. An electronic motion sensor, or "motion detector," is a device that—as its name indicates—senses, or detects motion. An electronic motion detector contains an optical, microwave, or acoustic sensor, and may further include a transmitter for illumination. Several types of motion sensing devices are widely known. The present invention preferably employs a printed circuit board incorporating—in addition to LEDs and other circuit components—a light sensor and/or a motion sensor powered by a standard off-the-shelf low profile coin-type manganese dioxide 3V lithium cell battery (e.g. CR1620).

The illumination subassembly 10 may be used to selectively control the emission of light 12, via a remote control device (not shown) that is programmed for communicating with the printed circuit board circuitry 69, in a manner that is well known in the art. Through the remote control device, for example, the user may bias the system between ON and OFF states, and alter the lighting mode (e.g. between a flashing/blinking state and a non-flashing/blinking state).

In some embodiments of the invention, the illumination subassembly 10 may be incorporated into a two-piece (or multi-piece) lug nut housing structure, in lieu of the unitary (i.e. one-piece) lug nut main body 22 and light-emitting subassembly containment portion 24 of illumination lug nut assembly 100. For example, referring now to FIGS. 9A through 10B, a selectively-illuminable lug nut assembly 400 is shown in accordance with an alternate implementation of applicant's invention.

Exemplary lug nut assembly 400 incorporates a two-piece housing lug nut housing structure, including a main body 402 and an independent, stand-alone illumination subassembly containment body 420 selectively attachable to a distal end 406 of the main body. The main body 402 extends from a proximal end 404 to a distal end 406. At its proximal end 404, the main body 402 has a threaded aperture 408 extending along a central axis (FIG. 9A) and terminating at a distal wall (not shown) to define a main body interior space 410. The threaded aperture 408 is configured for threading engagement with corresponding threads on the exterior surface of a threaded vehicle wheel stud (not shown). At an opposite distal end 406, the main body portion 402 may be configured for releasable attachment to, or selective mating engagement with, a light-emitting subassembly containment portion 420. For example, at its distal end 406, main body 402 terminates at an exterior surface 412 of a main body end wall 417 having a threaded aperture 416 extending completely therethrough along the central axis shown in FIG. 9A. A sidewall, or exterior surface 418, may be ribbed (as shown) or incorporate any other exterior surface configuration (or exterior surface feature) considered beneficial to the structure of a vehicle lug nut. Furthermore, a series of radially spaced-apart recesses 414 may be provided in the peripheral edge of distal end surface 412.

Figure 9A:
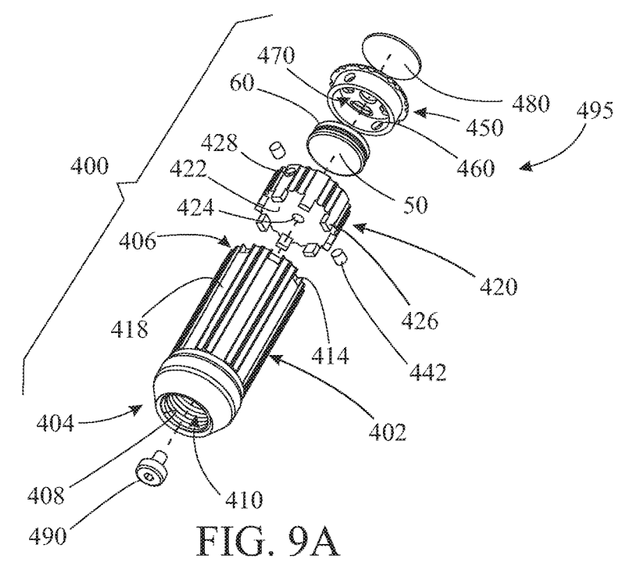
FIG. 9A is a bottom exploded perspective view of a selectively-illuminable vehicle lug nut assembly in accordance with an alternate embodiment of the invention.
Figure 9B:
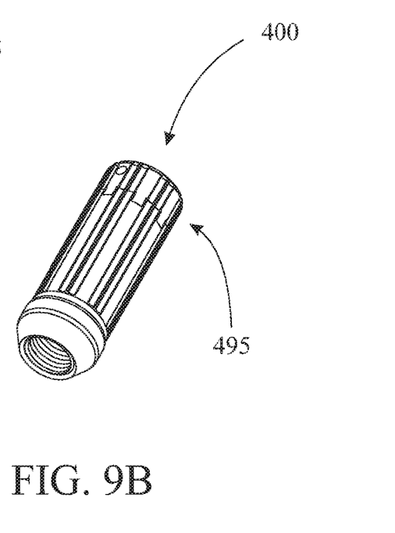
FIG. 9B is a bottom perspective view of the vehicle lug nut introduced in FIG. 9A in a fully-assembled state.
Figure 10A:
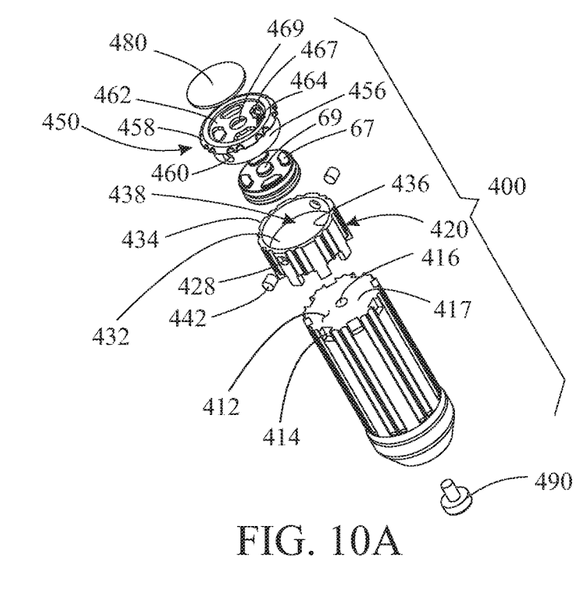
FIG. 10A is a top exploded perspective view of a the vehicle lug nut introduced in FIG. 9A.
Figure 10B:
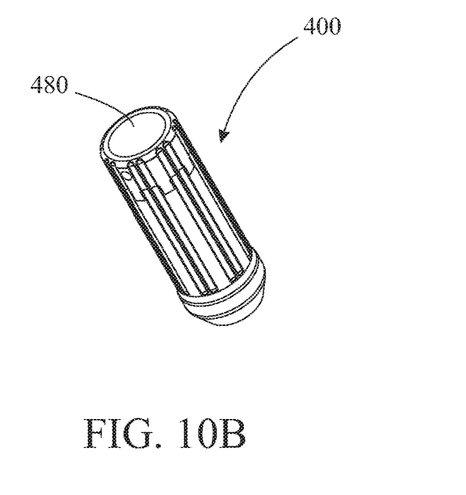
FIG. 10B is a top perspective view of the vehicle lug nut introduced in FIG. 10A in a fully-assembled state.

The light-emitting subassembly containment portion 420 is in the form of a circular base having an upper surface 432 surrounded by a distal end portion 436 of contiguous sidewall 418a circumscribing the circular base and extending a distance beyond the upper surface 432 to define an interior containment space 438 for receiving components of illumination subassembly 495. The sidewall exterior surface 418a is preferably identical in structure to that of corresponding sidewall 418 of main body 402. That is, sidewall exterior surface 418a may be ribbed (as shown) or incorporate any other exterior surface configuration (or exterior surface feature) considered beneficial to the structure of a vehicle lug nut (e.g. having a surface structure configured for being engaged by a lug nut installation/removal tool). As described in more detail below, when the illumination subassembly 495 is in a fully-assembled state, interior containment space 438 contains: battery 50; printed circuit board assembly (PCBA) 60 overlying battery 50; and circular sidewall 456 of end cap 450 circumscribing the battery and PCBA.

More specifically, battery 50 and overlying PCBA 60 are seated within interior space 470 defined by circular sidewall 456, in such an alignment that light-emitting diodes (LEDS) 67 and light/motion detection circuit components 69 are received through corresponding apertures, 467 and 469, extending through end cap transverse wall 462. Moreover, a protective translucent pane 480 may be sealingly seated within translucent pane-receiving cavity 464 defined at a distal end of end cap 450. With battery 50 and PCBA 60 frictionally supported within end cap interior space 470 (and, preferably, translucent pane 480 sealingly seated within translucent pane-receiving cavity 464), end cap 450 is inserted into interior containment space 438 of light-emitting subassembly containment portion 420 until end cap peripheral lip 458 engages upper edge 434 of sidewall 418a. Subsequently, apertures 460 through end cap sidewall 456 are aligned with corresponding apertures 428 through distal end portion 436 of contiguous sidewall 418a, and threaded fasteners 490 are threadably inserted therethrough to effectively couple the end cap to the illumination subassembly containment body 420. As will be apparent to those skilled in the art, alternative systems for coupling end cap 450 to containment body 420 may be employed without departing from the intended scope of the invention.

Subsequently, fully-assembled illumination subassembly 495 is received atop distal end 406 of main body 402, such that radially spaced-apart projections 426 of containment body sidewall 418a are aligned with and inserted into the corresponding radially spaced-apart recesses 414 in the peripheral edge of distal end surface 412. Finally, threaded fastener 490 is threadably received (from within main body interior space 410) through aperture 416 extending through main body end wall 417, and into aperture 424 extending into circular base lower surface 422. In this manner, the fully-assembled lug nut illumination subassembly 495 (including containment body 420) is releasably-attached to the lug nut main body 402. At this point, the illuminated lug nut assembly 400 may be threadably attached to a wheel stud of a vehicle.

Since many modifications, variations, and changes in detail can be made to describe preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An illuminable lug nut assembly, comprising:
an illumination subassembly;
a rigid housing having a central axis and including a lug nut main body portion and an illumination subassembly containment portion, the lug nut main body portion having an internally-threaded bore extending therein from a lower end of the lug nut main body portion and terminating at an interior end wall of the lug nut main body portion, the illumination subassembly containment portion at least partially defined by an annular sidewall extending upwardly from a lower end of the illumination subassembly containment portion, the annular sidewall and the lower surface of the illumination subassembly containment portion, together, defining an interior space sized and shaped for containing said illumination subassembly; and
a circular lug nut cap sized to be seated upon an interior shoulder of an upper edge of said annular sidewall,
wherein, upon threadably attaching the lug nut main body portion to a wheel stud of a vehicle, light emitted from the illumination subassembly is visible at an upper end of the illumination subassembly containment portion.

2. The illuminable lug nut assembly of claim 1, wherein the lug nut main body portion and the illumination subassembly containment portion further comprise a unitary structure.

3. The illuminable lug nut assembly of claim 1, wherein the lug nut main body portion and the illumination subassembly containment portion further comprise independent structures releasably attachable to one another.

4. The illuminable lug nut assembly of claim 3, wherein the lug nut main body portion further comprises:
an exterior surface;
an internally-threaded bore extending from said lower end of the lug nut main body portion and terminating at said lug nut main body interior end wall, the threaded bore defining a main body interior space sized, shaped and configured for threading engagement with a vehicle wheel stud; and
an upper end exterior surface having a central aperture provided therein and extending completely through the lug nut main body interior end wall.

5. The illuminable lug nut assembly of claim 4, wherein the illumination subassembly containment body further comprises:
a circular base having an upper surface and a lower surface, the lower surface of the circular base having a central aperture provided therein; and
a contiguous sidewall circumscribing the circular base and extending distally a distance beyond the upper surface of said circular base to define an interior containment space of said illumination subassembly containment portion, the contiguous sidewall of the illumination subassembly containment portion having at least one aperture extending therethrough.

6. The illuminable lug nut assembly of claim 5, further comprising an end cap configured for being releasably coupled to an upper portion of said illumination subassembly containment portion.

7. The illuminable lug nut assembly of claim 6, wherein said end cap further comprises:
a cylindrical sidewall having at least one aperture extending therethrough;
a transverse wall horizontally-traversing an interior surface of the end cap cylindrical sidewall and slightly inset from a distal edge of the end cap annular sidewall, the transverse wall having an upper surface and a lower surface, the lower surface of the transverse wall and the interior surface of the cylindrical sidewall, together, defining an illumination subassembly containment space; and
a peripheral lip projecting radially outward from a distal edge of the end cap cylindrical sidewall, the transverse wall having LED-receiving apertures surrounding a central sensor-receiving aperture.

8. The illuminable lug nut assembly of claim 6, further comprising:
a series of radially spaced-apart recesses provided in a peripheral edge portion of the distal end exterior surface of said lug nut main body; and
a corresponding series of radially spaced-apart projections extending proximally from the sidewall of said end cap, wherein the radially spaced-apart projections of said end cap sidewall are received within the radially spaced-apart recesses of said lug nut main body.

9. The illuminable lug nut assembly of claim 7, wherein the illumination subassembly further comprises:
a battery; and
a printed circuit board assembly overlying an upper surface of the battery, the printed circuit board assembly having light-emitting diodes and a sensor disposed upon an upper surface thereof, the sensor comprising at least one of a light sensor and a motion detection sensor,
wherein, the battery and overlying printed circuit board assembly are seated within the illumination subassembly containment space of said end cap such that the light-emitting diodes and sensor disposed upon the upper surface of the printed circuit board assembly extend into the respective LED-receiving apertures and sensor-receiving aperture in the transverse wall.

10. The illuminable lug nut assembly recited in claim 9, wherein the illumination subassembly further comprises a translucent pane sized and shaped to be seated within a shallow depression defined by the interior surface of the end cap cylindrical sidewall and the upper surface of the slightly-inset transverse wall.

11. The illuminable lug nut assembly of claim 1, wherein an upper surface of the lug nut cap further comprises:
  a perimeter sidewall; and
  an annular interior portion defining a central cavity, the annular interior portion radially inset from the perimeter sidewall to define an annular groove therebetween.

12. The illuminable lug nut assembly of claim 11, further comprising:
  a battery; and
  a printed circuit board assembly overlying an upper surface of the battery,
  wherein the battery and printed circuit board assembly are seated within the illumination subassembly containment portion interior space.

13. The illuminable lug nut assembly of claim 12, further comprising:
  a light-emitting diode (LED) light ring seated within the lug nut cap annular groove;
  a sensor seated within the central cavity in the upper surface of said lug nut cap, the sensor comprising at least one of a light sensor and a motion sensor;
  said LED light ring electrically connected to both LED circuitry of said printed circuit board assembly and a negative terminal of said battery;
  said sensor electrically connected to sensor circuitry of said printed circuit board assembly; and
  said printed circuit board assembly electrically connected to a positive terminal of said battery.

* * * * *